United States Patent [19]

Botbyl

[11] Patent Number: 4,905,398
[45] Date of Patent: Mar. 6, 1990

[54] FISHING POLE WITH INDICATOR MEANS

[75] Inventor: Brian J. Botbyl, 150 E. Oakwood, Muskegon Hgts., Mich. 49444

[73] Assignee: Brian J. Botbyl, Muskegon Heights, Mich.

[21] Appl. No.: 319,328

[22] Filed: Mar. 6, 1989

[51] Int. Cl.$^4$ .............................................. A01K 97/12
[52] U.S. Cl. .................................... 43/17; 43/18.1; 43/20; 242/104; 242/118.4; 242/128; 242/245
[58] Field of Search .................. 43/15, 16, 17, 17.5, 43/24, 18.1, 20; 242/84.2 J, 84.21, 84.1 K, 245, 84.1 L, 84.1 M, 84.5 R, 267, 118.4, 104, 128

[56] References Cited

U.S. PATENT DOCUMENTS

| | | |
|---|---|---|
| 2,744,351 | 5/1956 | Smith . |
| 2,795,072 | 7/1957 | Porter . |
| 3,057,105 | 3/1961 | Moses ..................................... 43/16 |
| 3,143,822 | 8/1964 | Schooley . |
| 3,373,953 | 3/1968 | Grove . |
| 3,465,982 | 9/1969 | Coshow . |
| 3,530,611 | 9/1970 | Britt . |
| 3,563,489 | 2/1971 | Coshow . |
| 3,624,689 | 11/1971 | Rizzo . |
| 3,666,197 | 5/1972 | Coshow . |
| 3,670,443 | 6/1972 | Federline . |
| 3,958,770 | 5/1976 | Murphy . |
| 3,979,852 | 9/1976 | Johnson . |
| 4,006,550 | 2/1977 | Rizzo ..................................... 43/17 |
| 4,020,579 | 5/1977 | Snider ..................................... 43/17 |
| 4,021,957 | 5/1977 | Gleason . |
| 4,502,241 | 5/1985 | Haspala . |
| 4,507,890 | 4/1985 | Thorne . |
| 4,541,195 | 9/1985 | Delaney . |
| 4,677,784 | 7/1987 | Butkus . |

Primary Examiner—Nicholas P. Godici
Assistant Examiner—Mike Starkweather
Attorney, Agent, or Firm—Price, Heneveld, Cooper, DeWitt & Litton

[57] ABSTRACT

A fishing pole with indicator means particularly useful in fishing through the ice. The pole is preferably constructed primarily of wood and includes a nose piece on the end of which is a rod above which is mounted an elongated, flexible member attached to the nose piece and extending at an angle vertically above the rod. Extending through the nose piece is an adjustable member forming an electrial contact which the flexible member engages when a pull is exerted on its end by the fish line. The adjustable contact member determines the sensitivity of the indicator means which includes a buzzer and an LED light operatively connected to the adjustable contact member and elongated flexible member. A reel mounted on top of the handle includes a groove formed between two flanges. A plurality of radially extending slots are cut into the flanges and a rubber band is inserted in two of the adjacent slots for regulating the amount of fish line that can be let out of the reel.

12 Claims, 3 Drawing Sheets

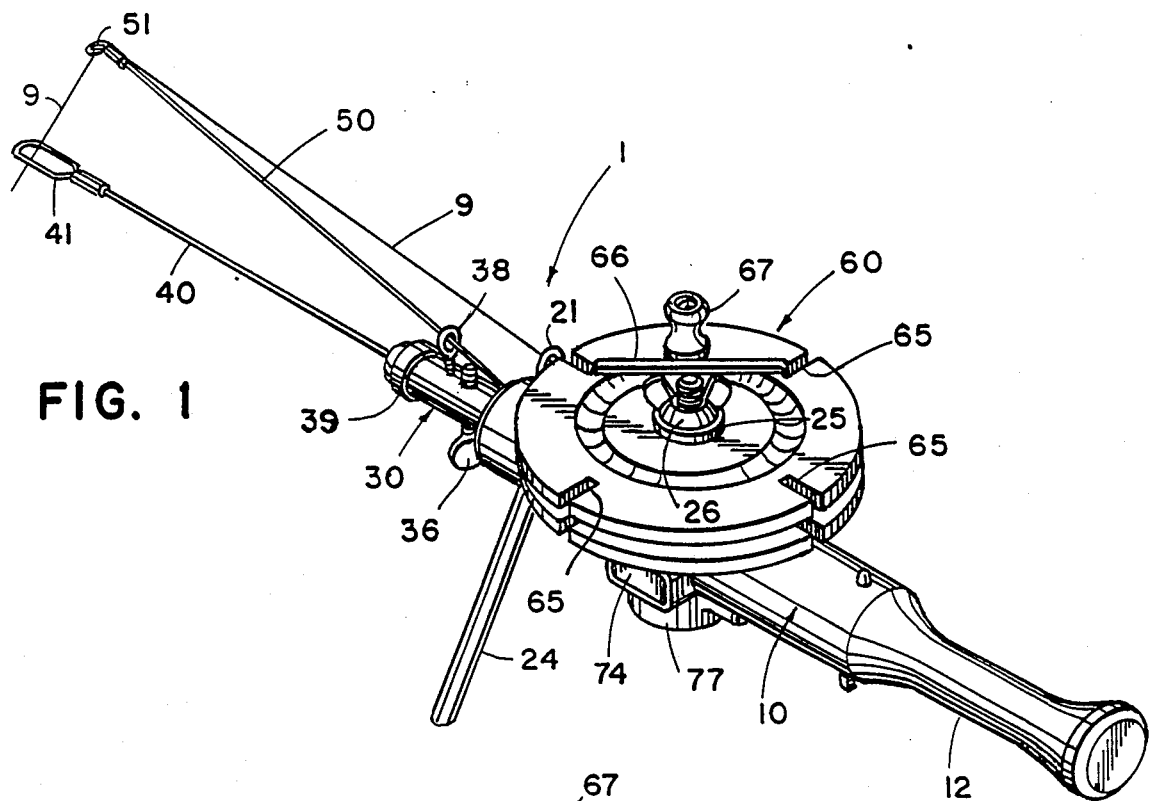
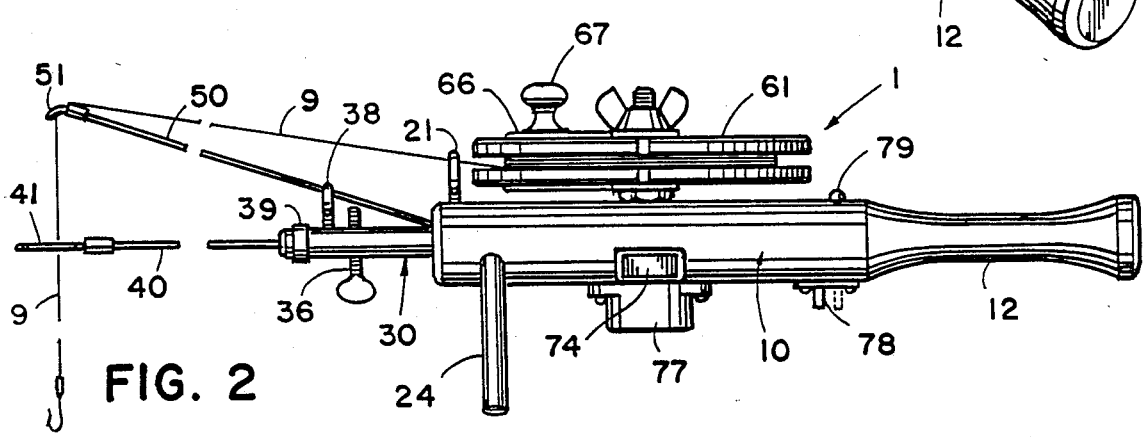
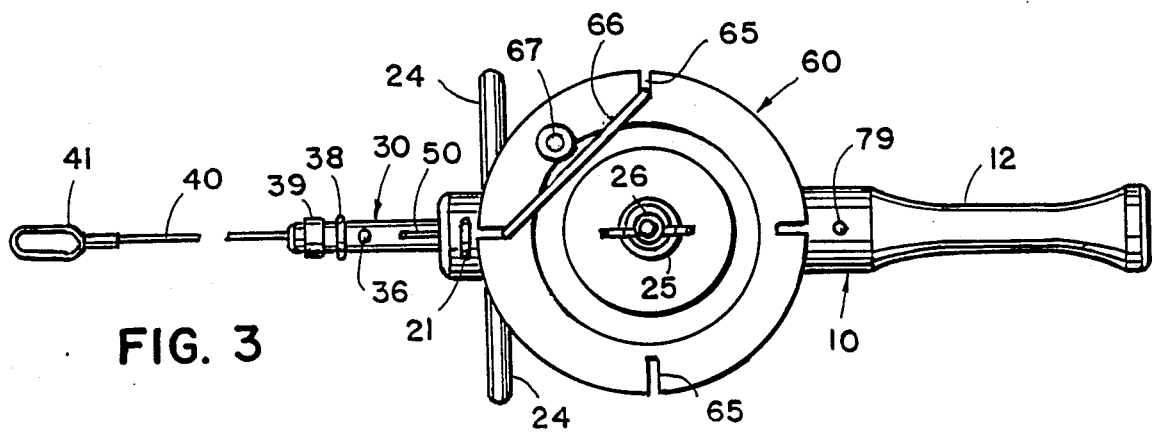

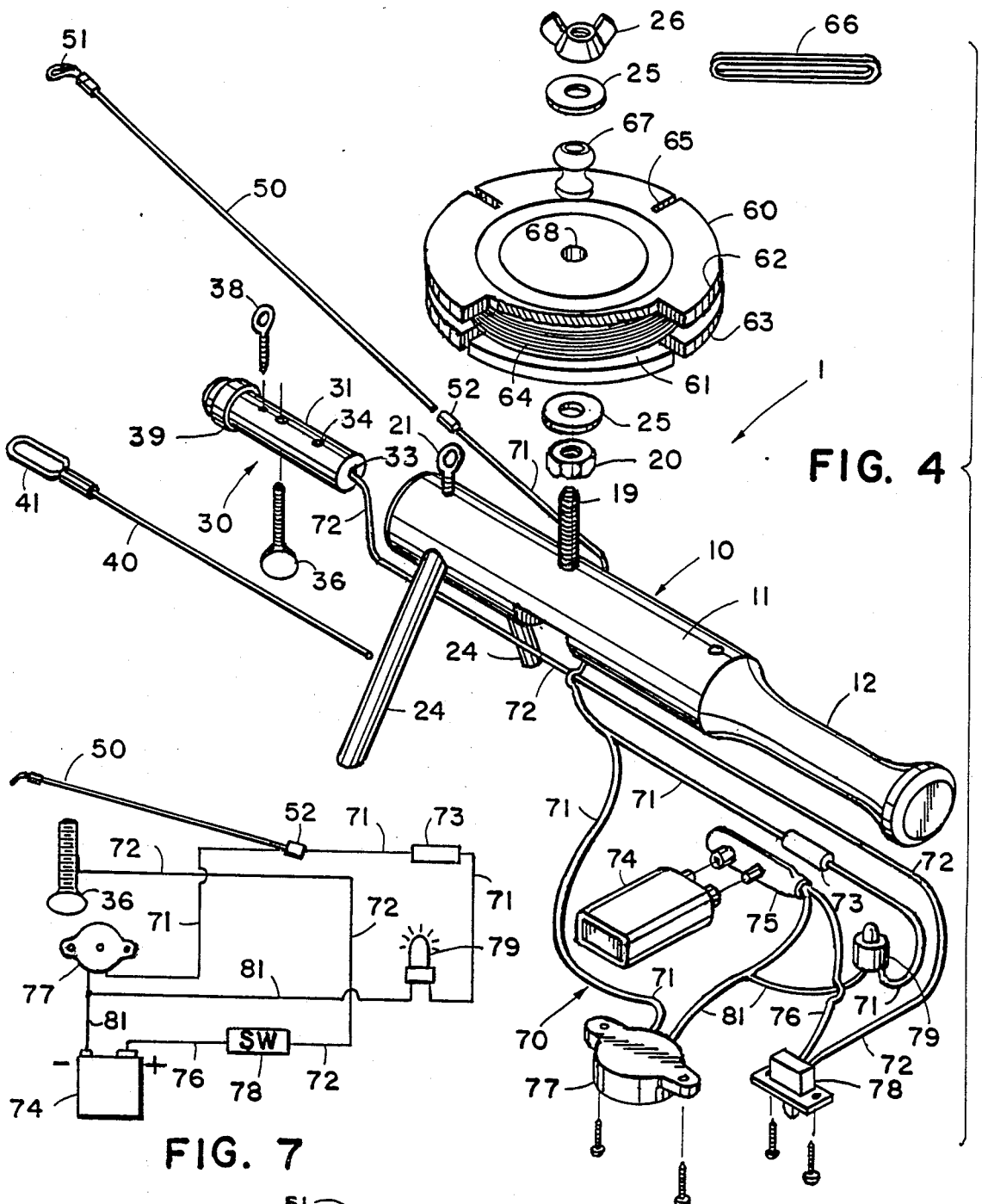
FIG. 4
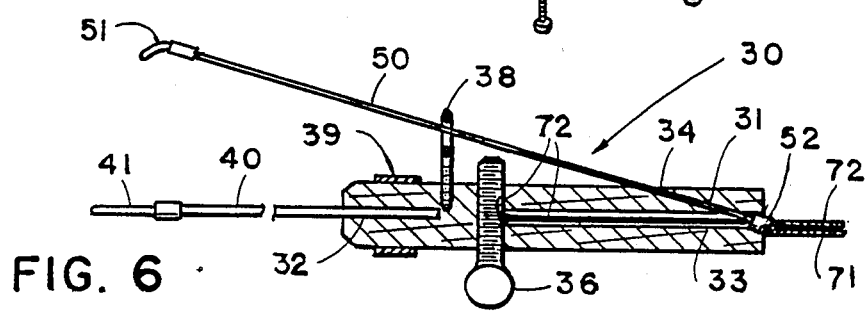
FIG. 7
FIG. 6

FISHING POLE WITH INDICATOR MEANS

BACKGROUND OF THE INVENTION

This invention relates to a fishing pole and more particularly to a fishing pole having means for indicating a fish has bitten or is on the end of the fishing line. This fishing pole is used primarily for ice fishing but could be utilized for open water fishing as well.

Fishing poles with means for indicating whether a fish is biting or is on the end of a line are generally extremely well known and old. However, most of these types of fishing poles are complicated requiring a substantial amount of tooling to make the parts from which they are constructed. An example of this type of pole is that disclosed in U.S. Pat. No. 4,507,890 entitled FISHING ROD INDICATOR. While such patent and many others disclose fishing pole indicators with signaling devices, none of them are constructed as simply as the present invention out of materials such as wood with conventional well known elements.

SUMMARY OF THE INVENTION

The present invention comprises a pole primarily constructed of wood and a number of conventional elements, all assembled in a unique way to produce a fishing pole which is foolproof in operation, easily adjustable for adjusting the sensitivity of the pole required to give a signal and which is easily assembled.

The present invention also has the advantage of being constructed of wood which gives a solid feeling to the pole while at the same time providing a pole which is relatively warm and can be easily handled in extremely cold weather as compared to other poles constructed of metal and the like which when cold will stick to the skin of the hands of the user and are extremely uncomfortable to handle.

Modern fishermen prefer to ice fish in the limited confines of a shanty. The present invention being as short in length as possible and still very sensitive makes it ideally suited for such use.

Another aspect of this invention is a means for setting the depth of the line let out by the reel, such means including slots spaced around the circumference of the wheel and receiving a member such as a rubber band over which the line is wound when the line is wound up on the reel, the amount of line wound over the rubber band establishing the depth of the line. This feature is used when a certain depth is desired because of fish biting at such depth. However, it releases when large fish take line out.

BRIEF DESCRIPTION OF THE DRAWINGS

The following description is made in conjunction with the accompanying drawings wherein:

FIG. 1 is a top, perspective view of the fishing pole of this invention;

FIG. 2 is a side, elevational view of the fishing pole of this invention;

FIG. 3 is a top, plan view of the fishing pole of this invention;

FIG. 4 is an exploded view of the various parts forming the construction of this invention;

FIG. 6 is a cross-sectional view of the nose assembly of the fishing pole of this invention;

FIG. 7 is a wiring diagram of the electrical circuit of this invention; and

DESCRIPTION OF THE PREFERRED EMBODIMENT

Figure 5:
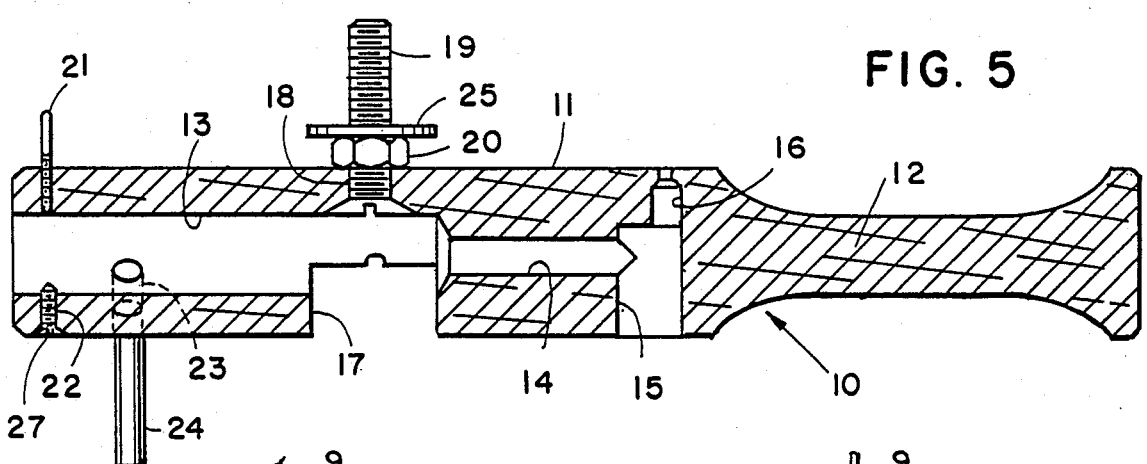
FIG. 5 is a cross-sectional, elevational view of the handle forming a part of the fishing pole of this invention.

Referring to the drawings, FIGS. 1-4 disclose the pole 1 which includes the handle assembly 10, the nose assembly 30 mounted on one end of the handle assembly 10, the rod 40 mounted on the free end of the nose assembly 30, the flexible actuator, electrically conductive member 50, the reel 60 and the electrical component circuitry 70.

The handle assembly 10 includes the handle member 11, a cross section of which is disclosed in FIG. 5. The handle member is constructed of a cylindrical piece of wood, one end of which is turned to provide the grip end 12. A central bore 13 approximately ½ inch in diameter is drilled into the other end of the handle member. This bore is reduced to a ⅜ inch bore 14 extending to a transverse hole 15 provided to receive a switch and a LED light as will be explained hereinafter. Extending from the hole 15 is the opening 16 in which the LED light is mounted and through which it extends so as to be visible from the outside of the handle member.

Intermediate the length of the cylindrical part of the handle member is located a slot 17 for receiving and mounting a battery therein. Opposite this slot, an opening 18 is provided receiving the bolt 19 on which is located the nut 20. Bolt 19 is provided for the purpose of rotatably supporting the reel as will be explained hereinafter.

At the forward end of the handle member 11, a screw eye 21 is located for receiving and guiding the fishing line from the reel as will be explained hereinafter. Opposite the screw eye is an opening for receiving a set screw for retaining the nose assembly in place. Located slightly rearwardly of the screw eye and the pilot hole 22 are the holes 23 (only one shown in FIG. 5) for receiving the support legs 24 (FIGS. 1-4).

The nose assembly 30 is best disclosed in FIG. 6. It includes the nose member 31 having the bores 32 and 33 extending from opposite ends thereof. Bore 32 receives a fiberglass rod 34 on the end of which is the rod tip or eye 35. A thumb screw 36 is threaded transversely through the nose member 31. This thumb screw serves as a contact member to which wire 71 extending through the bore 33 is electrically connected. The nose member 31 has a slanted opening 34 receiving the elongated, flexible member 50 which is a piano wire having an eye 51 attached to the end thereof through which the fishing line extends as will be explained hereinafter. On the other end of the flexible member 50 is a brass tube 52 to which the wire 72 is electrically connected by soldering or otherwise. Also connected to the wire 72 is the 1000 ohm ¼ watt resister 73.

As disclosed in the drawings, the elongated, flexible member 50 extends at an acute angle from the axis of the nose member 31.

The reel 60 (FIGS. 1-4) is formed from a disc-shaped circular piece of wood having a groove 61 cut therein for receiving the fishing line wound thereon. It therefore has two spaced flanges 62 and 63 extending to the cylindrical surface 64 about which the fishing line is wound. Four radially extending slots 65 are cut into the flanges 62 and 63 for receiving the rubber band 66 for the purpose as will be described hereinafter.

Extending upwardly from the top flange 62 of the reel 61 is the handle 67 for rotating reel 61 which is rotatably mounted on the bolt 19 above the nut 12 of the handle assembly 10. It is held on the bolt by means of the washer 25 and wing nut 26.

The electrical component circuitry is best disclosed in FIGS. 4 and 7. It includes the battery 74 to which is connected the connector 75 from which extends wires 81 and 76. Switch 78 is connected to battery 74 through wire 76 and to thumb screw 36 via wire 72. Buzzer 77 is connected to battery 74 by wire 81 and to flexible actuator member 50 through wires 75 and 71. LED light 79 is connected to battery 74 through wire 81 and to actuator member 50 through line 71 in which is connected resistor 73.

ASSEMBLY

Having described each of the subassemblies and components of this invention, the assembly should be evident. The assembly could be accomplished by different sequential steps. However, for the purpose of illustrating and clearing describing the assembly, the following sequential steps are suggested.

The components of the nose assembly are first assembled, that is, by first assembling the fiberglass rod 40 into the bore 32 provided in the end of the nose member 31. A compression fitting 34 having previously been located around the rod 40 is then forced over the end of the nose member 31 in a well known manner for holding the rod 40 rigidly in place. The screw eye 38 is then screwed into the opening provided for it. The thumb screw 36 is also screwed into the opening provided for it and a wire 72 is electrically connected to thumb screw 36. The elongated, flexible member 50, i.e., the piano wire member, is inserted in the opening 34 and brass tube 52 is slipped onto the end with the wire 71 and fitting 52 being soldered to the end of the piano wire 50. The wires 71 and 72 are pulled through the bore 13 as the nose member 31 is inserted into bore 13. Set screw 27 is threaded into the opening 22 for holding the nose member 31 in place.

Having secured the nose assembly in the handle member 11, the handle assembly is completed by screwing in the screw eye 21, inserting the bolt 19 through the opening 18 and holding it in place by the nut 20. Wire lead 71 is then passed through bore 14 and electrically connected to the LED light 79 to which wire lead 81 is also connected. Switch 78 and LED light 79 are then inserted into the opening 15 and 16, respectively, and are held in place by the screws disclosed in FIG. 4. Before securing switch 78 within the hole 15, lead 81 is passed through bore 14 and connected to the buzzer 77 which also is previously connected by line 76 to the battery connector 75. Having made the above electrical connections, the battery 74 is inserted in the slot 17 and the buzzer 77 is mounted thereover and secured in place by the screws as disclosed in FIG. 4.

The legs 24 which fit into the openings 23 are normally removed until the pole is to be used. The legs are held in by a press fit.

The reel assembly 60 is next mounted on the bolt 19 by placing the opening 68 over bolt 19 and securing the same by means of the washer 25 and wing nut 26. The pole is then ready for use by stringing the fishing line through the eye of screw eye 21, through the eye 51 of the elongated, flexible member 50 and through the eye 41 of the rod 40.

OPERATION

Having described the structure of the components and the assembly thereof, the operation of this fish pole should be quite evident. As viewed in FIG. 2, the fish line 11 is released from the reel 61 by a pull exerted on the fish line by a weight on the end of the line or by hand or by rotating the reel in a counterclockwise direction until the proper depth is reached. When the fish bites, it tugs on the fish line 9 causing the elongated, flexible member 50 be bend downwardly. The flexing of member 50 causes it to contact the top end of thumb screw 36 which closes the circuit through buzzer 77 and LED light causing the buzzer 77 to buzz and the LED light 79 to illuminate giving a signal that a fish is biting or s caught on the end of the hook of the fish line. This of course assumes that the switch 78 has been closed, it being understood that when not in use the switch 78 is open to prevent accidental closing of the circuit and subsequent drainage on the battery 74.

The sensitivity of the pole can be adjusted by adjusting thumb screw 36 so as to adjust the distance between the top end of thumb screw 36 and the element 50.

Figure 8A:
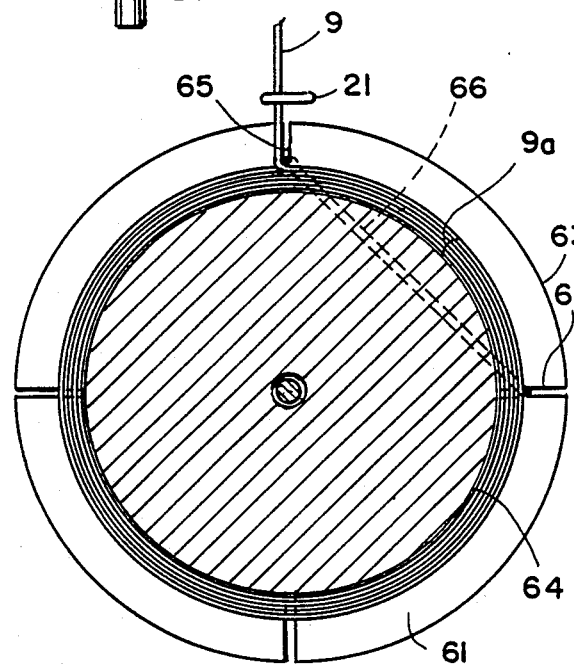
FIGS. 8A and 8B are cross-sectional views through the reel of this invention illustrating the line depth control provided by this invention.
Figure 8B:
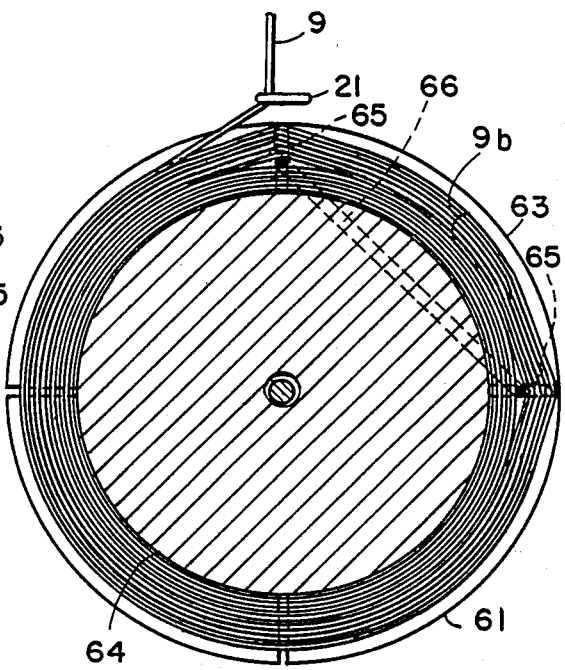

Once the proper depth is found for the hook, that depth can be established by placing the rubber band 62 into adjacent slots 65 when the line 9 is at the proper depth. This establishes the desired amount of line to be released from the reel 61 should the wheel be wound up to check the bait or to remove a fish from the hook. FIGS. 8A and 8B demonstrate this operation. FIG. 8A discloses the reel when the fish line has been let out to its desired depth. In this position, the rubber band 66 prevents the line on the reel as designated by reference numeral 9a from being wound off from the reel 61. FIG. 8B discloses the condition of the wheel and the line when the line is wound on the reel for either changing the bait or removing a fish or any other reason. In this condition, that line portion 9a is still located under the band but the portion 9b that was let down into the water is wound over the rubber band 66. Thus, when the line is later let down into the water, the portion 9b of the line 9 will be let down into the water whereas the portion 9a is restricted from leaving the reel. Thus, by a simple construction comprising a couple slots in the flanges 61 and 62 and extending a rubber band into these slots the desired depth of the line 11 is established.

Having disclosed my invention, it should be evident that it is made up of a number of conventional component parts assembled in a way that is easy and inexpensively assembled. The comfort of the reel furnished by constructing it of wood and the aesthetics of this wood product all add to the desired quality of this fishing pole.

Although I have described the preferred embodiment of this invention, it should be understood that embodiments can be made that would not deviate from the spirit of the invention. Therefore, the scope of this patent should only be determined by its definition as set forth in the appended claims and all equivalents thereof.

The embodiments of the invention in which an exclusive property or privilege is claimed are defined as follows.

1. A fishing pole having means for indicating when a fish bites comprising: an elongated handle having an elongated bore extending a substantial distance from one end thereof;

a nose member having a cylindrical end of substantially the same diameter as said bore and supported in said bore;

an elongated rod supported by said nose member and having a first guide tip on its extreme end;

an elongated, electrically conductive, flexible member extending from the end of said handle at an angle upwardly from said rod at an acute angle from the horizontal and substantially in vertical alignment with said rod and having a second guide tip at its end;

an elongated, electrical contact member extending through and adjustably mounted on said nose member adjacent said handle and in vertical alignment with said elongated, flexible member for adjusting the space between said contact member and flexible member whereby when said flexible member is bent downwardly in response to a fish bite, the flexible member flexes downwardly and engages said electrical contact member to provide an electrical contact therebetween;

an electrical circuit including a battery, indicator means and connecting wires; said connecting wires electrically connected to said flexible member, to said electrical contact and to said battery and indicator means whereby when said flexible member engages said electrical contact said battery is electrically connected to said indicator means to warn of a fish bite.

2. The fishing pole of claim 1 in which the handle and nose members are made of wood.

3. The fishing pole of claim 1 in which substantial portions of the electrical wires are located in said bore.

4. The fishing pole of claim 3 in which the indicator means and battery are each supported partially within cutout portions in said handle.

5. The fishing pole of claim 1 in which one end of said flexible member extends into and is supported in an opening in said nose member, said opening being inclined at an acute angle to the longitudinal axis of said nose member.

6. The fishing pole of claim 4 in which a slot is formed in the outer surface of said handle and said battery is mounted in said slot.

7. The fishing pole of claim 1 in which the electrical contact member is a thumb screw threadably mounted through said nose member for adjustment relative to the elongated flexible member for adjusting the sensitivity of the pole to fish bites.

8. The fishing pole of claim 4 in which an opening extending transverse to the longitudinal axis of said handle is formed, said indicator means being mounted in said opening.

9. The fishing pole of claim 1 in which a reel is rotatably mounted on said handle on an axis located substantially on the vertical plane on which the rod and said elongated, flexible member are located.

10. The fishing pole of claim 9 in which the reel has a cylindrical portion on which the fish line is wound and spaced flanges extending therefrom for holding the fish line on said cylindrical portion;

a fish line extending from said reel, through said first and second guide tips;

a plurality of spaced, radially extending slots on the outer circumference of the reel, said slots being located in said flanges and extending radially inwardly to the said cylindrical portion; and a rubber band located in and extended between two of said spaced slots for setting the depth of the fish line which can be let out of said reel.

11. A fish reel having a cylindrical portion on which the fish line is wound and spaced flanges extending therefrom for holding the fish line on said cylindrical portion;

a plurality of spaced, radially extending slots on the outer circumference of the reel, said slots being located in said flanges and extending radially inwardly to the said cylindrical portion; and a rubber band located in and extended between two of said spaced slots for setting the depth of the fish line which can be let out of said reel.

12. A fishing pole having means for indicating when a fish bites comprising: an elongated handle having an elongated bore extending a substantial distance from one end thereof;

a nose member having a cylindrical end of substantially the same diameter as said bore and supported in said bore;

an elongated rod supported by said nose member and having a first guide tip on its extreme end;

an elongated, electrically conductive, flexible member extending from the end of said handle at an angle upwardly from said rod at an acute angle from the horizontal and substantially in vertical alignment with said rod and having a second guide tip at its end;

an elongated, electrical contact member extending through and adjustably mounted on said nose member adjacent said handle and in vertical alignment with said elongated, flexible member for adjusting the space between said contact member and flexible member whereby when said flexible member is bent downwardly in response to a fish bite, the flexible member flexes downwardly and engages said electrical contact member to provide an electrical contact therebetween;

an electrical circuit including a battery, indicator means and connecting wires; said connecting wires electrically connected to said flexible member, to said electrical contact and to said battery and indicator means whereby when said flexible member engages said electrical contact said battery is electrically connected to said indicator means to warn of a fish bite;

a reel rotatably mounted on said handle on an axis located substantially on the vertical plane on which the rod and said elongated, flexible member are located; said reel having a cylindrical portion on which said fish line is wound and spaced flanges extending therefrom for holding said fish line on said cylindrical portion;

a fish line extending from said reel through said first and second guide tips;

a plurality of spaced, radially extending slots on the outer circumference of the reel, said slots being located in said flanges and extending radially inwardly to the said cylindrical portion; and a rubber band located in and extended between two of said spaced slots for setting the depth of the fish line which can be let out of said reel.

* * * * *